Jan. 6, 1942.  T. A. RICH  2,269,225
ELECTROSTATIC METERING APPARATUS
Filed Dec. 21, 1938  2 Sheets-Sheet 1
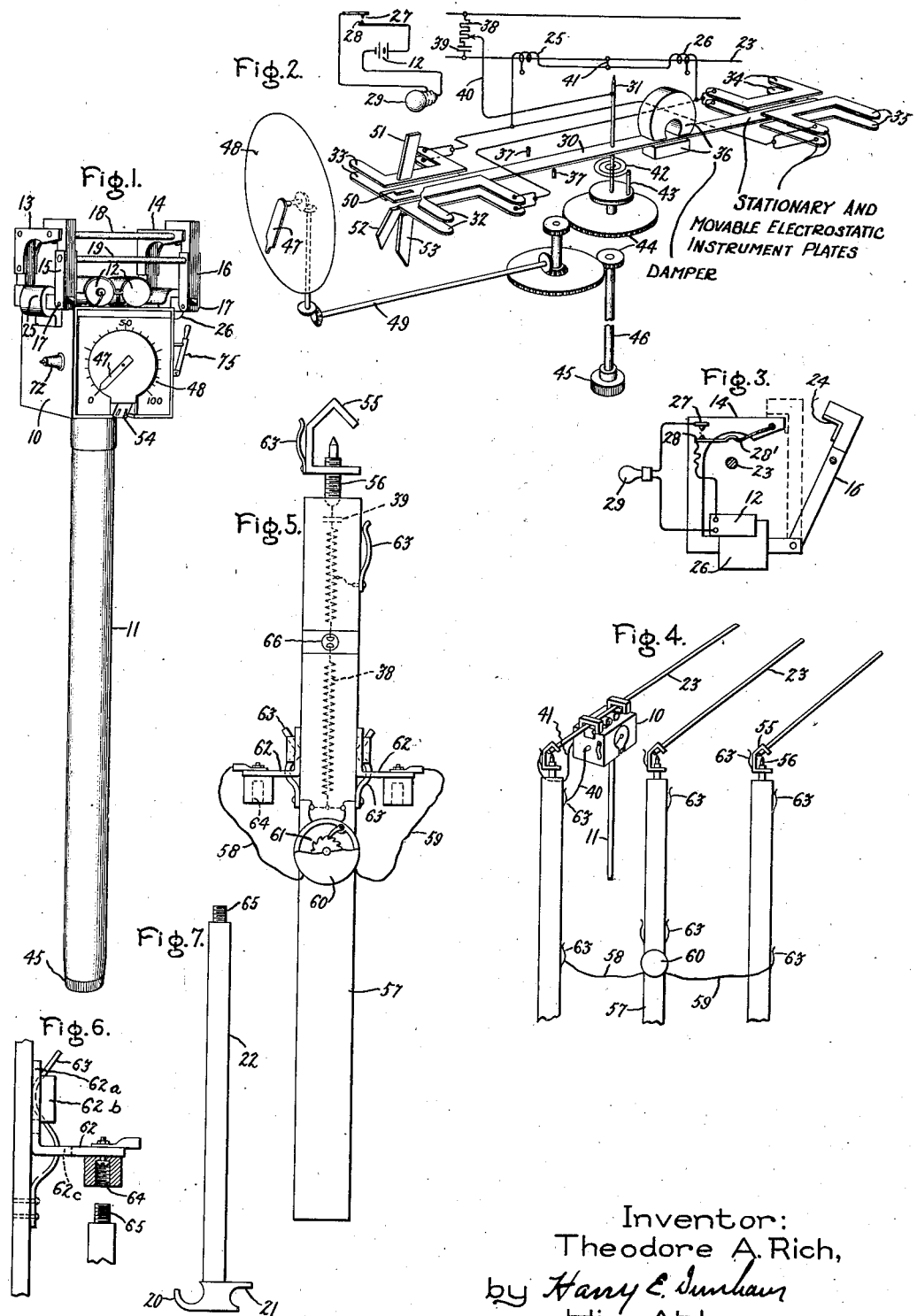
Inventor:
Theodore A. Rich,
by Harry E. Dunham
His Attorney.

Jan. 6, 1942. T. A. RICH 2,269,225
ELECTROSTATIC METERING APPARATUS
Filed Dec. 21, 1938 2 Sheets—Sheet 2

Inventor:
Theodore A. Rich,
by Harry E. Dunham
His Attorney.

Patented Jan. 6, 1942

2,269,225

UNITED STATES PATENT OFFICE 2,269,225

ELECTROSTATIC METERING APPARATUS

Theodore A. Rich, Schenectady, N. Y., assignor to General Electric Company, a corporation of New York Application December 21, 1938, Serial No. 247,075

11 Claims. (Cl. 171—95)

My invention relates to alternating current electrostatic metering apparatus. One object of my invention is to provide portable apparatus of this character which may be carried up a high tension transmission tower and coupled in measuring relation with a high tension power circuit and measurements made without danger to the person using the apparatus and without cutting the circuit or interrupting the service. Another object of my invention is to provide such apparatus that can, by simple changes in connections, be used for measuring different quantities, such as the reactive power, volts and amperes over different measurement ranges.

Figure 8:
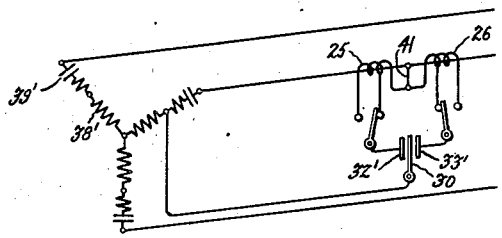
Figure 9:
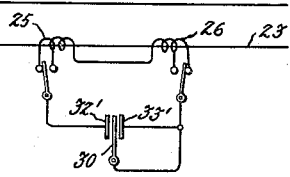
Figure 10:
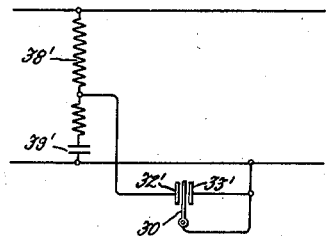
Figure 11:
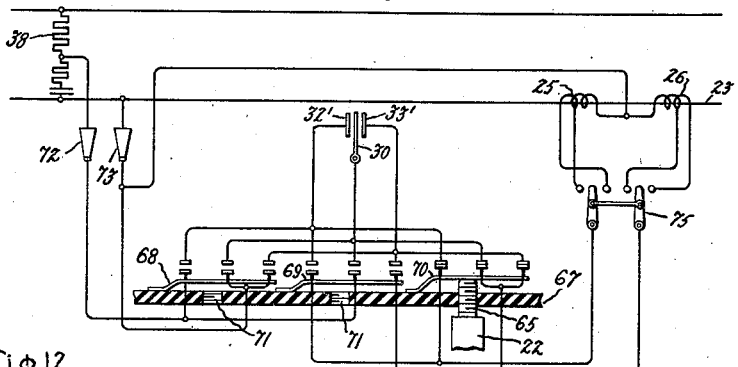
Figure 12:
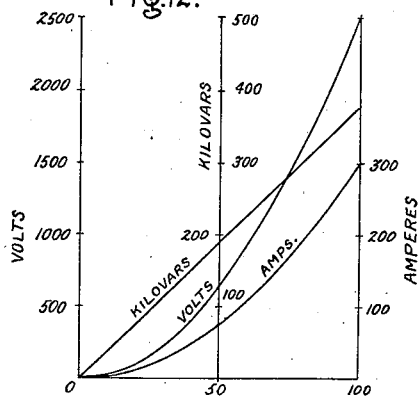

In carrying my invention into effect I employ a hook-on transformer arrangement to obtain a voltage proportional to current and a hook-on resistance element for obtaining measurement voltages. These voltages excite an electrostatic meter which is a part of and is supported by the hook-on transformer equipment. The deflection of the moving part of the electrostatic meter is opposed by an adjustable spring and measurements are taken by noting the extent of spring adjustment necessary to maintain the deflection at a zero value. A light beam indicator particularly designed for good visibility under the rather awkward measurement conditions encountered is used to indicate such zero deflection, and the extent of adjustment of the spring is registered on an easily read scale. Insulating handle means are provided for making the various connections and adjustments in order to protect the user of the equipment from dangerous voltages. These and other features of the invention will be more fully described in connection with the accompanying drawings in which Fig. 1 represents a face view of the transformer and meter assembly, Fig. 2 is a perspective view of the meter elements and also indicating the connections for metering single phase reactive volt amperes hereinafter referred to as vars, Fig. 3 is a sectional end view of the transformer with the hook thereof partially open and also showing an automatic switch for turning on and off the lamp employed in the meter. Fig. 4 is a perspective view of the metering equipment as hooked in measuring relation with a high voltage transmission line. Fig. 5 is an explanatory enlarged view of one of the voltage reducing resistance sticks shown in Fig. 4. Fig. 6 illustrates one of the lead supporting clips which are provided on the equipments whenever necessary or desirable. Fig. 7 is an insulated tool for making various connections and adjustments of the apparatus. Fig. 8 is a diagrammatic representation of the connections used for measuring the three-phase vars. Figs. 9 and 10 diagrammatically represent the connections for measuring amperes and volts respectively. Fig. 11 is a sectional view of a portion of the bottom of the meter box and meter switching means contained thereon, and Fig. 12 shows calibration curves used for interpolating the instrument reading in terms of the quantities measured. The features of my invention which are believed to be novel and patentable will be pointed out in the claims appended hereto.

The main part of the equipment preferably takes the form shown in Fig. 1, and comprises a housing 10 having an insulated handle 11 extending from its bottom and supporting batteries 12 and hook-on transformer apparatus on its top. In order that the transformer apparatus may best support the equipment when it is hung on a transmission line cable as represented in Fig. 4, the transformer apparatus is made in two sections 13 and 14. The parts of these transformer sections which are indicated by reference characters 13 and 14 are laminated magnetic core sections rigidly secured to the top of the housing 10 and are generally U-shaped with their open ends facing in the same horizontal direction. The open ends of these core sections are adapted to be mechanically closed and partially magnetically closed by laminated magnetic core parts 15 and 16 which are pivoted as at 17 to the bottom ends of the U-shaped core parts 13 and 14 respectively. These transformer cores lie in parallel planes and have their stationary portions connected by the housing and tie rod 18. The hinged parts are connected by the tie rod 19. The core assembly may be opened, as indicated in Fig. 3, by using the hook part 20 of the tool shown in Fig. 7 to pull outward on rod 19, and the core assembly may be closed, as indicated in Figs. 1 and 4 by shoving inward on tie rod 19 using the forked tool part 21 of the tool of Fig. 7. The handle 22 of the tool of Fig. 7 is of insulating material. Hence it will be seen that with the core assembly open, the meter with its transformer may be raised by the insulated handle 11 and hooked over the cable of a high voltage line and the core closed with the tool of Fig. 7 without danger of the operator coming in close proximity to the high voltage conductor. Thus, in Fig. 4 the meter equipment is hooked over the high voltage cable 23 and is well supported by such cable and may be left there indefinitely. Likewise the meter equipment may be removed after opening the core with the hook 20 of the tool of Fig. 7 without danger to the operator. The insulated handles 11 and 22 may be as long as desired. Handles which are from three to six feet long will generally be suitable where the operator climbs the pole or tower to hook the metering equipment in metering position over a cable supported by such pole or tower.

Where the metering equipment is to be used as explained hereinafter, it is desirable that the transformer coupling with the primary conductor 23 contain an air gap. This is accomplished as shown in Fig. 3 by providing a spacer 24 of nonmagnetic material at the point where the hinged part 16 closes on stationary part 14. Although this arrangement is here referred to as a transformer it should be recognized that it works under a special set of conditions. The secondary current is negligibly small and the secondary voltage equals $I\omega M$ where I is the primary current, $\omega$ is $2\pi$ times the frequency and M is the mutual inductance. Another feature shown in Fig. 3 is an automatic switch having a stationary contact 27 and a movable contact 28 for closing a circuit containing lamp 29 and dry cells 12 when the apparatus is hung on a cable such as indicated at 23, and for opening this circuit again when the apparatus is removed from the cable. This is accomplished by having movable contact 28 supported on a resilient member 28' which is positioned so as to be raised by the cable 23 to close the contacts when the apparatus is hooked over and supported by such cable.

The lower stationary limb parts of the transformer cores have secondary coils 25 and 26 wound thereon and these coils are for supplying measurement voltages proportional to line current to the electrostatic meter in housing 10 and may have different voltage taps and be connected in series, as desired.

A perspective view of the electrostatic instrument which is contained in housing 10 is shown in Fig. 2. This instrument comprises a long armature vane 30 secured on shaft 31. Near the opposite ends of armature 30 are sets of stationary plates 32, 33, 34 and 35. The sets of plates 32 and 33 at one end of the armature are on opposite sides of a central position of the armature vane and the plates of each set are above and below the armature vane such that the vane may move between them without touching. The arrangement is such as to bring about clockwise rotation of 30 due to electrostatic attraction between one set of plates and the armature and counter-clockwise rotation of 30 due to electrostatic attraction between the other set of plates and the armature when the different parts are charged. The plates and armature arrangement at the other end is the same. The combination may be considered as comprising duplicate electrostatic instruments with their moving vane armatures on opposite ends of the vane 30. If considered as two instruments they are connected in parallel to produce joint action. Thus, plates 32 at one end and on one side of the armature are electrically connected to plates 34 at the other end and on the opposite side of the armature so that the forces between the armature and this group of plates will all tend to turn the armature 30 in the same direction. Likewise plates 33 and 35 are connected together in another group and hence will have additive electrostatic torque action on the armature. At 36 I have provided a permanent magnet damper for the armature, and at 37 I have provided stops to limit the movement of the armature to a small angle on either side of its central position.

The electrical connections of the instrument as represented in Fig. 2 is for the measurement of single phase vars. It is noted that the stationary plates of the instrument are connected across the terminals of the two current transformers connected in series. Hence a voltage $Ei$ will exist between stationary plates 34 and 35 which is proportional to the current in line conductor 23. Owing to the air gap in the magnetic circuit of the transformers as mentioned above in connection with Fig. 3 and the fact that no current flows in the transformer secondary circuit, this voltage $Ei$ will be nearly 90 degrees from the current in line 23, and if it be assumed that the power factor of the single phase power circuit represented is unity, it will be nearly 90 degrees from the voltage of the power circuit. A voltage $Ev$ proportional to the line voltage is impressed between the armature 30 and stationary plates. An impedance 38 is connected across the single phase power circuit. This impedance is mostly resistance but contains a condenser 39 which is sufficient to shift the voltage $Ev$ exactly 90 degrees from voltage $Ei$ at unity power factor. A lead 40 to a tap on this impedance is connected to armature vane 30 through its shaft 31, and a connection 41 connects the middle point of the current transformer circuit to line conductor 23. Hence the voltage $Ev$ is 90 degrees displaced with respect to the voltage $Ei$ between the stationary plates when the power factor of the single phase circuit is unity.

In the schematic connection diagram of Fig. 8, the instrument is connected to measure vars. The voltage between 30 and $32^1$ is equal to $Ev+Ei$ in a vector sense. The voltage between 30 and $33^1$ is equal to $Ev-Ei$ also in a vector sense. The electrostatic torque between charged plates of this type is $$\frac{1}{2}V^2\frac{dC}{d\theta}$$

where V is the voltage between the plates and $$\frac{dC}{d\theta}$$

is the rate of change of capacity with angle. Absolute units must be used in evaluating this equation. As shown in Fig. 1, the net voltage between 30, $32^1$ would cause a counterclockwise rotation and the voltage between 30, $33^1$ would cause a clockwise rotation. These torques are proportional to the square of the net voltage or $$(\dot{E}_v+\dot{E}_i)^2-(\dot{E}_v-\dot{E}_i)^2=4\dot{E}_v\dot{E}_i$$

where the dot signifies a vector, and as is well-known $$4\dot{E}_v\dot{E}_i=4E_vE_i \cos \lfloor E_v, E_i$$

$\lfloor E_v, E_i$ as previously shown is equal to $\lfloor E, I +90°$ $$\cos (\lfloor E, I +90°)=\sin \lfloor E, I \rfloor$$

or sin $\theta$ where $\theta$ is the power factor angle. The net torque on 30 then is proportional to $EI$ sine $\theta$ or to the vars.

If the current I lags the voltage E the torque will be in one direction, and if the current leads the voltage the torque will be in the opposite direction. The torque of the instrument is opposed by a spiral spring 42, and for the measurement of vars this spring will usually be arranged to wind up when it opposes the deflection of the armature in the direction which it deflects when the current lags the voltage. In most cases the power-factor will be lagging and this use is preferred. On leading power-factors the unit must be rotated 180° with respect to the line conductor 43 in Fig. 4. The spiral spring has its inner end connected to shaft 31 and its outer end connected to a pin 43 arranged to be adjusted about shaft 31 through a gear train 44, a shaft 46, and a thumb piece 45 by means of which fine adjustment of the spring may be had. The gears and rods 46 and 49 are made of insulating material. The shaft 46 of this adjusting arrangement extends down through the hollow insulating handle 11 shown in Fig. 1 such that the spring adjustment may be made by the operator turning thumb piece 45 while in a safe position with respect to any high voltage line with which the instrument may be connected. Such adjustment of spring 42 in a direction to oppose the torque of armature 30 when tending to deflect away from a mid position also moves a pointer 47 up scale with respect to a scale 48. This is accomplished through the gear train which branches off through shaft 49. Measurements are made by increasing the torque of spring 42 to return armature 30 to a zero or mid position and noting the extent of such spring adjustment on scale 48 in terms of the actual electrical measurement or in such terms as may be quickly interpolated in vars or whatever is being measured.

In addition to the parts described the operator needs an accurate device that will give a clear indication from several feet below the meter when the armature 30 has been brought back to a mid position. For this purpose I provide the lamp 29, light from which may be seen by the operator from below the meter through the glass strips 52 or 53. Light from lamp 29 is conducted by glass strip 51 to a central slit 50 in the end of armature 30. The width of the slit 50 is approximately equal to the thickness of 52 and 53. The movement of the armature 30 is restrained by stops 37 so that at one extreme the slot is over the end of 52 and at the other extreme over the end of 53. The ends of 52 and 53 near the armature are very close together but their far ends are well separated. In use the light appears to jump from 52 to 53 (perhaps ¾") when the armature moves the width of the slot 50 which may be 0.020". Balance is obtained when a slight motion of 45 will shift the light back and forth. In general, the loads will have enough fluctuation so that the light will oscillate back and forth at balance.

The impedance device 38 which is used for obtaining a suitable voltage proportional to line voltage is preferably inclosed in a long insulating tube 57 of the form shown in Fig. 5. The upper end of this tube is provided with a hook terminal 55 which may be hooked over a high voltage conductor and is threaded to bolt 56 secured in the top of the tube so that by turning the tube 57 the conductor may be clamped between the hook and bolt to provide a firm electrical and mechanical connection. As indicated, the bolt is connected to one end of the impedance. The other end of the impedance is connected to one or more flexible cables such as shown at 58 and 59 for making other line connections. In order to have these cables long enough for all purposes and still avoid having them hang down to the lower handle part of the insulated tube 57, any extra length of such cables is wound on reels one of which is represented at 60. These reels may have a self winding spring arrangement 61 like that used on the common window curtain roll, so that the cable may be pulled out and allowed to rewind as needed. The free ends of the cables 58 and 59 are provided with connecting clips 62 the details of which are best shown in Fig. 6 and which are arranged to be hooked over hooks 63 provided on different parts of the apparatus wherever it is desired to make a connection or to support the terminal out of the way when not in use. Clips 62 have a turned up part 62', the central portion of which is punched out to form an opening flanked by the punched out flaps 62b. Also another opening is provided at 62c through which the hook 63 is passed. Each such clip 62 is provided with a threaded opening 64 facing downward into which the threaded end 65 of the tool shown in Fig. 7 may be screwed for the purpose of lifting these clips off of hooks 63 and transferring them to some other hook. This permits various connections of the apparatus to be made and changed while the circuits are alive without danger to the operator. There will also be a flexible cable, reel, and clip secured to the rear side of housing 10 for making the connection 41 of Fig. 2. Such flexible cable connection is partially shown at 41 in Fig. 4. The connection 40 of Fig. 2 is also indicated in Fig. 4. The device indicated at 66, Fig. 5, is a small glow tube in the impedance circuit which glows whenever the impedance is connected across a high voltage line. This glow tube may be seen in a window of the tubular housing and serves as an indication to the operator as to whether or not the impedance is alive.

Fig. 8 is a diagrammatic representation of the connections of my apparatus for measuring 3φ vars; and Fig. 4 is a pictorial representation of the equipment as used for this connection. In Fig. 8 the electrostatic instrument is simply indicated by one set of each group of the stationary plates designated 32' and 33' separated by the movable vane armature 30. For this connection it is assumed that the phases are balanced and that the meter will measure ⅓ of the 3-phase vars.

Fig. 9 represents the connections of the meter for measuring current. In this connection, one group of the stationary plates designated 33' is connected to the armature vane 30 and to one terminal of the transformer circuit. The other group of stationary plates designated 32' is connected to the other terminal of the transformer circuit. Thus a voltage proportional to current will exist between plates 32' and armature 30. A corresponding torque will result. Here the group of stationary plates 33' produces no torque.

Fig. 10 indicates the connection for measuring voltage. Here a suitable part of the line voltage is impressed between the armature and one set of stationary plates. The measurement is of course proportional to the line voltage. As in Fig. 9, the set of stationary plates 33' are idle.

To facilitate the interpretation of the reading of pointer 47 on scale 48 for the various different measurements that may be made by this instrument, it will be desirable to have the scale calibrated in percent from 0 to 100 and then provide the operator with a chart or charts of the character shown in Fig. 12. This chart comprises curves designated bolts, amps, and kilovars. The abscissa is in percent and correspond to the indication of pointer 47 on dial 48. Three sets of ordinate graduations are provided for volts, kilovars and amperes respectively. The curves are simply the corresponding calibration curves of the meter for the different measurements referred to the 100% scale of the dial 48. If, for example, current is being measured using the connection indicated in Fig. 9 and a reading of 50 is obtained, reference to the calibration curve for amperes shows that the current is about 75 amps. Similarly, if vars are being measured using the connection of Fig. 2 and a reading of 50 is obtained, the reactive volt amperes are read off the kilovar curve and scale and is 190 kilovars. It will be understood, of course, that these curve relations are obtained with a particular tap on impedance 38, and that if this tap point is changed the calibration chart must be changed accordingly.

As shown in Figs. 8 and 9, the current transformers have different taps together with a tap changing switch. This adapts the instrument for measurements over a correspondingly wide range of primary current values, and when the current transformer tap is changed the reading of amperes and kilovars obtained from the chart must be multiplied by the change in current transformer ratio. The tap changing switch for this purpose and the switches for changing the other connections of the instrument are shown in Fig. 11. The current transformer tap changing switch is indicated by reference character 75. This switch will preferably be mounted on the outside side of housing 10 as indicated in Fig. 1, and will have an operating cross bar that may be operated by the tools 20 and 21 of the insulated operating rod of Fig. 7 so as to open or close this switch in either direction from a safe position. The switches for connecting the electrostatic instrument for different measurements are preferably assembled just above the bottom wall 67 of housing 10, and for the uses of the apparatus described will be three in number and are indicated by reference characters 68, 69 and 70. These switches each have three upper and three lower contacts. The upper contacts are stationary and connected in parallel to the three terminals of the electrostatic instrument designated 30, 32' and 33'. The lower contacts of each switch are insulated from and mounted on resilient supports secured to the insulated wall 67, and are normally spaced away from their cooperating stationary contacts with the switches open as shown for the switches 68 and 69. Beneath these movable contact supports there are threaded openings 71 in wall 67 into which the tool 65 of the insulated handled tool of Fig. 7 may be screwed. When this tool is screwed in as shown for switch 70 the resilient support of the movable contacts is raised and the switch closed. The movable contacts of these switches are suitably connected to the current transformer tap switch and the voltage terminals of the apparatus as shown so that the various measurements previously described may be made by altering the switches. As arranged in Fig. 11, it will be seen that when switch 68 is closed the apparatus is connected to measure line volts as indicated in Fig. 10. When switches 75 and 69 are closed the apparatus is connected for measuring single phase vars. This connection is equivalent to that shown in Fig. 3. When switches 75 and 70 are closed the apparatus is connected for measuring current as in Fig. 9. For the last two connections the current measurement range may be varied by throwing the current transformer tap changing switch 75. The voltage bushing represented at 72, Fig. 11, is shown in Figs. 1 and 4. The other voltage terminal 73 of Fig. 11 is on the back side of the housing and hence is not seen in Figs. 1 and 4.

In using this apparatus, the operator ordinarily carries the equipment up a transmission tower or pole with the hook arrangement of the transformer open. Then using the insulated handle 11, he hooks the transformer over one of the lines 23 of the high voltage line. Then using the insulated tool of Fig. 7, he closes the hook arrangement of the transformer. If only a current measurement is to be taken the impedance sticks such as shown in Figs. 6 and 4 are not required. If, however, voltage or var measurements are to be made, the required impedance stick or sticks are hooked on the transmission line and the necessary connections made using the insulated tool of Fig. 7.

The circuit of lamp 29 is closed automatically when the apparatus is hooked on the line as explained in connection with Fig. 2. Hence the operator is ready to take his measurements by tuning thumb nut 45 until the instrument deflection has been brought back to zero and reading the indication of pointer 47. Any one or all of the measurements previously explained may be made one after the other and the results recorded in a note book after which the apparatus is removed, using the insulated tools as before, and the apparatus carried down the tower. Hence the apparatus is suitable for making the measurements on high voltage lines without danger to the operator and without cutting any lines or interrupting service. The apparatus is especially adapted for making temporary measurements at isolated points on transmission lines where it is impracticable or undesirable to install permanent metering equipment but where it is desirable to make measurements occasionally. The equipment used will include properly marked impedance sticks adapted for lines of different voltages and the necessary calibration charts.

While I have shown and described a particular embodiment of my invention, modifications thereof will be apparent to those skilled in the art. I do not, therefore, desire my invention to be limited to the particular construction shown and described, and I intend in the appended claims to cover all modifications within the spirit and scope of my invention.

What I claim as new and desire to secure by Letters Patent of the United States is:

1. Portable electrostatic measuring equipment for use on high voltage lines comprising a housing, hook-on transformer means at the top of said housing for supporting the apparatus in measuring position on a cable, a hollow handle of insulating material extending downward from said housing, an electrostatic measuring instrument in said housing having a movable armature, a spring for opposing the electrostatic torque on said armature, insulating means extending through said handle for adjusting said spring and means observable from below said housing for indicating the adjustment of said spring in terms of the electrostatic torque on said armature.

2. Portable electrostatic measuring equipment, hook means thereon for supporting said equipment on a transmission line cable and connecting such equipment in measuring relation with such cable, a handle of insulating material extending downward from such equipment by means of which said equipment may be supported on and removed from measurement relation with a cable, said equipment including an electrostatic measuring instrument having a movable armature, an adjustable spring for opposing the measurement torque on said armature, insulating means extending to the lower end of said handle for adjusting said spring, means for indicating the zero measurement position of said armature and means for indicating the extent of adjustment of said spring in terms of the measurement torque of said instrument.

3. Portable measuring equipment for use on high voltage cables comprising a supporting housing, hook means on said housing whereby the equipment may be hooked on and supported by one of the cables of a multiple cable transmission line, a handle of insulating material extending downward from said housing by means of which the equipment may be supported on and removed from such cable, an electrostatic measuring instrument in said housing having stationary and movable electrostatic plates, an impedance device in the form of a stick-like structure having an insulating handle extending from one end and a hook at the other end whereby such impedance device may be supported by and connected to another cable of such transmission line, connections for connecting said impedance across such cables, connections for connecting a portion of said impedance across movable and stationary plates of said instrument for the measurement of voltage between said cables and a tool having an insulated handle to assist in making such connections, whereby such equipment may be connected and removed from voltage-measuring relation with high voltage cables with safety to the operator.

4. Electrostatic measuring equipment for measuring vars on a high voltage circuit comprising a transformer having a hinged magnetic circuit whereby the transformer may be hooked over a cable of the circuit to be metered, said transformer having an air gap in its magnetic circuit when in measuring relation with such cable, an electrostatic measuring instrument having opposite sets of stationary plates and a movable armature plate located between the opposite sets of stationary plates, means for connecting the sets of stationary plates across the secondary of said transformer, connections for impressing a voltage proportional to the voltage across such circuit between the movable plate of said instrument and the middle point of said secondary transformer circuit, and means for causing the phase angle of said voltage to be 90 degrees from the voltage across the secondary of said transformer when the power factor of said circuit is unity.

5. In combination with an alternating current circuit, electrostatic measuring equipment for making measurements on said circuit, said equipment comprising a transformer for obtaining a voltage proportional to the current flowing in said circuit, an impedance device for obtaining a voltage proportional to the voltage across said circuit, an electrostatic measuring instrument, circuit connecting means including switches for connecting said instrument to said transformer for measuring the current of said circuit, for connecting said instrument to said impedance, for measuring the voltage of said circuit, and connecting said instrument to both said transformer and impedance for measuring the vars of said circuit, said transformer and impedance being designed to produce voltages which are 90 degrees out of phase when the power factor of said circuit is unity.

6. Portable apparatus for obtaining measurements on high voltage circuits comprising a transformer, having a hinged core arranged to hook over a cable which cable then becomes the primary of such transformer, for producing a voltage proportional to the current in such cable, an impedance device arranged to be connected between cables of the circuit to be metered for obtaining a voltage proportional to the voltage of such circuit, a housing on which said transformer is mounted, an electrostatic measuring instrument in said housing, insulated handle means for said housing and impedance, by means of which the apparatus may be placed in measurement relation with and removed from a high voltage circuit with safety to the operator, and switching means on said apparatus for alternately connecting said instrument to the transformer for measuring the circuit current, to the impedance for measuring the circuit voltage, and to both the transformer and impedance for measuring the circuit vars, said transformer and impedance being designed to produce voltages which are 90 degrees displaced when the power factor of the circuit to be metered is unity.

7. Portable electrostatic measuring equipment for use on high voltage circuits, said equipment including a housing, a hook-on transformer on said housing, said transformer having a pair of hinged core magnetic circuits spaced apart and secured to said housing near opposite ends thereof, means mechanically connecting the hinged parts of said cores so that they may be opened and closed as a unit, said core parts serving for the purpose of removably suspending said housing on a cable of the circuit to be metered over which the core parts are hung, which cable then serves as the primary of such transformer, a secondary coil on each core portion, an electrostatic measuring instrument in said housing having two sets of stationary plates cooperating with a movable armature plate, means for connecting said coils in series across said two sets of stationary plates, and connections for impressing a voltage proportional to the voltage of the circuit to be metered, between said movable armature plate and a point in the secondary circuit of said transformer in the connection between the secondary coils.

8. In a portable measuring apparatus, a housing, a measuring instrument in said housing, a hook-on transformer on the top of said housing, an insulated handle extending from the bottom of said housing by means of which the housing may be suspended from a high voltage cable by the hook-on transformer with safety to the operator, a light beam indicating system for said instrument including a lamp, a supply circuit for said lamp including a switch for energizing and de-energizing said lamp, said switch being mounted on the hook-on transformer and having a movable switching member positioned to be closed by the operation of hooking said apparatus on a cable and opened by the operation of removing said apparatus from a cable.

9. In a portable measuring equipment for use on high voltage circuits, a housing, an electrostatic measuring instrument in said housing including a movable armature member, means on the housing for suspending the housing on and in measuring relation with a cable of a circuit to be metered, a lamp in said housing above said instrument, a restricted light path from said lamp downward through said instrument and housing, said path including an opening in the movable armature of said instrument when said armature is in a zero deflecting position, said armature serving to intercept said light path when the armature moves in either direction from a zero deflecting position.

10. In a portable measuring apparatus for use on high voltage circuits, a housing, means on said housing for suspending the housing from a cable of the circuit to be metered, a measuring instrument in said housing having a movable armature, connections for connecting said instrument in measuring relation to the circuit to be metered, a spring for opposing the movement of the armature away from a zero deflecting position, insulated adjusting means for said spring extending downward from said housing by means of which an operator located several feet below said housing may adjust said spring, a pointer connected with said spring-adjusting means, a scale over which said pointer moves, said pointer and scale being visible by an operator located below said housing, said pointer indicating zero on said scale when the armature is in a zero deflecting position and the spring is adjusted for zero armature torque, said pointer moving up-scale as the spring tension is adjusted to retain the armature in a zero deflecting position as the instrument torque increases during a measuring operation, and means observable from below said housing to indicate whether or not said armature is in a zero deflecting position.

11. Portable measuring equipment for use on high voltage circuits comprising a housing, a measuring instrument in said housing, a hook-on transformer having a hinged core on the top of said housing, a handle of insulating material extending from the bottom of said housing, said equipment being proportioned and designed to be carried up a high tension transmission tower by an operator and suspended on a cable of a high voltage circuit supported by such tower while the operator remains at a safe distance from such cable, means on the exterior of said housing and observable to an operator below said housing for indicating the measurement operations of the instrument, switching means on said housing and operable by an operator below said housing for connecting said instrument for different measurement operations and a tool having an insulated handle particularly designed for operating said switching means and for operating the hinged core of said transformer by an operator located below said housing a safe distance away from said apparatus.

THEODORE A. RICH.